(12) United States Patent
Danis et al.

(10) Patent No.: US 11,181,274 B2
(45) Date of Patent: Nov. 23, 2021

(54) COMBUSTION SYSTEM AND METHOD FOR ATTENUATION OF COMBUSTION DYNAMICS IN A GAS TURBINE ENGINE

(71) Applicant: General Electric Company, Schenectady, NY (US)

(72) Inventors: Allen Michael Danis, Mason, OH (US); Scott Matthew Bush, Liberty Township, OH (US); Arthur Wesley Johnson, Cincinnati, OH (US); Nicholas Ryan Overman, Sharonville, OH (US); Kent Hamilton Lyle, Cincinnati, OH (US); Eric John Stevens, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 202 days.

(21) Appl. No.: 15/681,875

(22) Filed: Aug. 21, 2017

(65) Prior Publication Data

US 2019/0056114 A1 Feb. 21, 2019

(51) Int. Cl.
*F23R 3/36* (2006.01)
*F02C 9/40* (2006.01)
(Continued)

(52) U.S. Cl.
CPC ............... *F23R 3/36* (2013.01); *F02C 3/06* (2013.01); *F02C 3/20* (2013.01); *F02C 7/222* (2013.01);
(Continued)

(58) Field of Classification Search
CPC .... F02C 3/06; F02C 3/20; F02C 7/222; F02C 7/228; F02C 9/28; F02C 9/40;
(Continued)

(56) References Cited

U.S. PATENT DOCUMENTS 4,991,398 A 2/1991 Clark et al.
6,360,525 B1 3/2002 Senior et al.
(Continued)

FOREIGN PATENT DOCUMENTS

EP 1278014 A2 1/2003
EP 2597285 A2 5/2013
(Continued)

OTHER PUBLICATIONS

European Search Report Corresponding to Application No. 181897000 dated Dec. 11, 2018.
(Continued)

*Primary Examiner* — Arun Goyal
*Assistant Examiner* — Henry Ng
(74) *Attorney, Agent, or Firm* — Venable LLP; Jacqueline A. DiRamio; Michele V. Frank

(57) ABSTRACT

The present disclosure is directed to a method of operating a combustion system to attenuate combustion dynamics. The method includes flowing, via a compressor section, an overall supply of air to the combustion system; flowing, via a fuel supply system, an overall flow of fuel to the combustion system; flowing, to a first fuel nozzle of the combustion system, a first supply of fuel defining a richer burning fuel-air mixture at the first fuel nozzle; flowing, to a second fuel nozzle of the combustion system, a second supply of fuel defining a leaner burning fuel-air mixture at the second fuel nozzle; and igniting the richer burning fuel-air mixture and the leaner burning fuel-air mixture to produce an overall fuel-air ratio at a combustion chamber of the combustion system.

16 Claims, 5 Drawing Sheets

(51) Int. Cl.
  *F23R 3/28* (2006.01)
  *F02C 7/22* (2006.01)
  *F02C 3/20* (2006.01)
  *F02C 3/06* (2006.01)
  *F02C 7/228* (2006.01)
  *F23R 3/34* (2006.01)
  *F02C 9/28* (2006.01)

(52) U.S. Cl.
  CPC ............ *F02C 7/228* (2013.01); *F02C 9/28* (2013.01); *F02C 9/40* (2013.01); *F23R 3/28* (2013.01); *F23R 3/286* (2013.01); *F23R 3/346* (2013.01); *F05D 2260/964* (2013.01); *F05D 2270/14* (2013.01); *F05D 2270/31* (2013.01); *F05D 2270/334* (2013.01); *F23R 2900/00013* (2013.01)

(58) Field of Classification Search
  CPC .......... F05D 2260/964; F05D 2270/14; F05D 2270/31; F05D 2270/334; F23R 3/36; F23R 3/28; F23R 3/286; F23R 3/346; F23R 2900/00013
  See application file for complete search history.

(56) References Cited

U.S. PATENT DOCUMENTS

| | | | |
|---|---|---|---|
| 8,434,311 B2 | 5/2013 | Zhang et al. | |
| 8,479,521 B2 | 7/2013 | Hoke | |
| 8,631,656 B2 | 1/2014 | Danis et al. | |
| 9,500,368 B2 | 11/2016 | Ryan | |
| 9,587,833 B2 | 3/2017 | Lee | |
| 2003/0014979 A1 | 1/2003 | Summerfield et al. | |
| 2003/0110777 A1* | 6/2003 | O'Connor | F02C 7/26 60/778 |
| 2006/0040225 A1* | 2/2006 | Garay | F23R 3/34 431/114 |
| 2008/0072605 A1 | 3/2008 | Hagen et al. | |
| 2009/0229238 A1* | 9/2009 | Zhang | F23N 5/16 60/39.24 |
| 2009/0241548 A1 | 10/2009 | Danis et al. | |
| 2012/0266602 A1 | 10/2012 | Haynes | |
| 2012/0275899 A1* | 11/2012 | Chandler | F02C 9/28 415/1 |
| 2013/0125556 A1* | 5/2013 | Hoke | F02C 7/228 60/773 |
| 2013/0340438 A1* | 12/2013 | Abreu | F02C 7/222 60/772 |
| 2014/0090391 A1* | 4/2014 | Burd | F23R 3/28 60/772 |
| 2015/0316266 A1* | 11/2015 | Prade | F23N 5/16 60/776 |
| 2016/0138808 A1* | 5/2016 | Huebner | F23R 3/34 60/734 |
| 2016/0298852 A1 | 10/2016 | Snyder, III | |

FOREIGN PATENT DOCUMENTS

| | | |
|---|---|---|
| JP | 2005/513319 A | 5/2005 |
| JP | 2008/082330 A | 4/2008 |
| JP | 2010/508469 A | 3/2010 |
| JP | 2010/285955 A | 12/2010 |
| JP | 2011/516809 A | 5/2011 |
| WO | WO2013/191954 A1 | 12/2013 |
| WO | WO2018141627 A1 | 8/2018 |

OTHER PUBLICATIONS

Machine Translated Japanese Office Action Corresponding to Application No. 2018152833 dated Oct. 29, 2019.

* cited by examiner

400

426- FLOW, THROUGH A FIRST FUEL-AIR MIXING FLOWPATH OF THE FIRST NOZZLE, A FIRST SUPPLY OF AIR FROM THE OVERALL SUPPLY OF AIR FROM THE COMPRESSOR SECTION

↓

428- MIX THE FIRST SUPPLY OF AIR WITH THE FIRST SUPPLY OF FUEL WITHIN THE FIRST FUEL-AIR MIXING FLOWPATH OF THE FIRST FUEL NOZZLE TO PRODUCE A RICHER FUEL-AIR MIXTURE

↓

432- FLOW, THROUGH A SECOND FUEL-AIR MIXING FLOWPATH OF THE SECND FUEL NOZZLE, A SECOND SUPPLY OF AIR FROM THE OVERALL SUPPLY OF AIR FROM THE COMPRESSOR SECTION

↓

434- MIX THE SECOND SUPPLY OF AIR WITH THE SECOND SUPPLY OF FUEL WITHIN THE SECOND FUEL-AIR MIXING FLOWPATH OF THE SECOND FUEL NOZZLE TO PRODUCE A LEANER FUEL-AIR MIXTURE → 450

436- FLOW AN APPROXIMATELY EQUAL FIRST SUPPLY OF FUEL AND SECOND SUPPLY OF FUEL TO PRODUCE AN APPROXIMATELY EQUAL FUEL-AIR MIXTURE AT EACH OF THE FIRST FUEL NOZZLE AND THE SECOND FUEL NOZZLE AT A MAXIMUM POWER OPERATING CONDITION

*FIG. 5*

COMBUSTION SYSTEM AND METHOD FOR ATTENUATION OF COMBUSTION DYNAMICS IN A GAS TURBINE ENGINE

FIELD

The present subject matter relates generally to methods and structures for attenuating combustion dynamics in gas turbine engine combustors.

BACKGROUND

Combustion systems for gas turbine engines are generally tasked to reduce a plurality of emissions, such as carbon monoxide (CO), carbon dioxide ($CO_2$), unburned hydrocarbons (UHC), smoke, and oxides of nitrogen ($NO_x$), while also reducing combustion dynamics, such as pressure oscillations resulting in undesired vibrations and acoustics that deteriorate engine hardware, performance, and operability. At the same time, combustor assemblies must operate to desired overall fuel-air ratios to produce a desired output energy for the gas turbine engine. Still further, the combustor assembly must remain relatively simple for aero, industrial, or marine purposes.

However, reducing emissions, attenuating combustion dynamics, maintaining simplicity, while producing requisite energy output generally include conflicting design criteria. One know solution for reducing emissions includes staged combustion, in which the plurality of fuel nozzles of the combustor assembly defines several "on" fuel nozzles and several "off" fuel nozzles at various engine operating conditions, such as ignition/re-light, sub-idle, idle, and generally low power conditions. Although staged combustion provides some reduction in emissions such as CO and UHC, selective fuel injection to sectors of on/off fuel nozzles results in attenuation of the combustion process at outer edges of individual combustion zones created by the alternate sections of on/off fuel nozzles. As such, combustion efficiency is lowered, resulting in the formation of emissions elsewhere in the combustion process such as UHC, CO, or both. Still further, such arrangements may suffer from increased combustion dynamics. Furthermore, the on/off arrangement of fuel nozzles results in greater annular or circumferential temperature variations (i.e., hot spots) that adversely affect turbine efficiency. Still further, although such arrangements provide some lean blow-out (LBO) benefits at low power, known arrangements may not provide reductions in combustion dynamics, as well as reductions in emissions and mitigated hot spots at high power outputs.

Therefore, there is a need for a combustion system that provides attenuation of combustion dynamics, reduced emissions, and decreased variations in circumferential temperature profile.

BRIEF DESCRIPTION

Aspects and advantages of the invention will be set forth in part in the following description, or may be obvious from the description, or may be learned through practice of the invention.

The present disclosure is directed to a method of operating a combustion system to attenuate combustion dynamics. The method includes flowing, via a compressor section, an overall supply of air to the combustion system; flowing, via a fuel supply system, an overall flow of fuel to the combustion system; flowing, to a first fuel nozzle of the combustion system, a first supply of fuel defining a rich fuel-air mixture at the first fuel nozzle; flowing, to a second fuel nozzle of the combustion system, a second supply of fuel defining a lean fuel-air mixture at the second fuel nozzle; and igniting the rich fuel-air mixture and the lean fuel-air mixture to produce an overall fuel-air ratio at a combustion chamber of the combustion system.

In various embodiments, the method further includes determining a desired overall fuel-air ratio at the combustion chamber based at least on the overall supply of air and the overall supply of fuel.

In one embodiment, the method further includes determining a fuel split to the first fuel nozzle and to the second fuel nozzle based on the overall flow of fuel that is further based at least on an operating condition of the engine, the overall supply of air, and the desired overall fuel-air ratio.

In another embodiment, the fuel split defines the first supply of fuel to the first fuel nozzle as at least 50% of the overall supply of fuel.

In yet another embodiment, the fuel split defines a quantity of the first supply of fuel to the first fuel nozzle defining a first equivalence ratio different from the second supply of fuel to the second fuel nozzle defining a second equivalence ratio when the operating condition of the engine is less than the maximum power operating condition.

In still another embodiment, the fuel split defines a quantity of the first supply of fuel to the first fuel nozzle as between approximately 50% and 99% of the overall supply of fuel. The fuel split defines a quantity of the second supply of fuel to the second fuel nozzle as a difference of the overall supply of fuel from the first supply of fuel to the first fuel nozzle.

In various embodiments, determining the fuel split is based on one or more of a lookup table, a function, or a curve.

In still various embodiments, the fuel split defines an approximately 50/50 split of the first supply of fuel to the first fuel nozzle and the second supply of fuel to the second fuel nozzle when the operating condition of the engine is at a maximum power operating condition. In one embodiment, the fuel split defines an approximately equal equivalence ratio at the first fuel nozzle and the second fuel nozzle when the operating condition of the engine is at a maximum power operating condition.

In another embodiment, determining the desired overall fuel-air ratio at the combustion chamber is a function of one or more of a pressure and a temperature of the overall supply of air at the combustion system.

In still various embodiments, the method further includes determining one or more acoustic modes at the combustion chamber; and determining a fuel split to the first fuel nozzle and to the second fuel nozzle based on the one or more acoustic modes to be attenuated at the combustion chamber.

In one embodiment, determining the fuel split is based at least on a desired overall fuel-air ratio at the combustion chamber and the one or more acoustic modes at the combustion chamber to be attenuated.

In still various embodiments, the method further includes adjusting the fuel split based on the desired overall fuel-air ratio and one or more of a frequency, amplitude, or both, or magnitude of changes thereof of a pressure at the combustion chamber, and a frequency, amplitude, or both of vibrations at the combustion chamber. In one embodiment, the method further includes measuring, via one or more sensors, a frequency, amplitude, or both, or magnitude of changes of a pressure at the combustion chamber, and a frequency, amplitude, or both of vibrations at the combustion chamber.

In one embodiment, the method further includes flowing, through a first fuel-air mixing flowpath of the first fuel nozzle, a first supply of air from the overall supply of air from the compressor section; mixing the first supply of air with the first supply of fuel within the first fuel-air mixing flowpath of the first fuel nozzle to produce a rich fuel-air mixture; flowing, through a second fuel-air mixing flowpath of the second fuel nozzle, a second supply of air from the overall supply of air from the compressor section; and mixing the second supply of air with the second supply of fuel within the second fuel-air mixing flowpath of the second fuel nozzle to produce a lean fuel-air mixture.

In another embodiment, the method further includes flowing an approximately equal first supply of fuel and second supply of fuel to produce an approximately equal fuel-air mixture at each of the first fuel nozzle and the second fuel nozzle at a maximum power operating condition.

In still another embodiment, the fuel split generally approaches approximately 50/50 as the operating condition of the engine increases toward maximum or high power.

In yet another embodiment, igniting the rich fuel-air mixture and the lean fuel-air mixture produces dissimilar local stoichiometries at the first fuel nozzle relative to the second fuel nozzle.

Another aspect of the present disclosure is directed to a combustion system for a gas turbine engine. The combustion system includes a liner and dome assembly together defining a combustion chamber; a first fuel nozzle and a second fuel nozzle together in alternating circumferential arrangement around a longitudinal centerline; and a fuel supply system providing a first supply of fuel to the first fuel nozzle and a second supply of fuel to the second fuel nozzle, wherein at least 50% of an overall supply of fuel is the first supply of fuel.

In one embodiment of the combustion system, the fuel supply system comprises a first fuel manifold coupled to the first fuel nozzle and a second fuel manifold coupled to the second fuel nozzle. The fuel supply system provides at least 50% of the overall supply of fuel to the first fuel nozzle and the remainder of the overall supply of fuel to the second fuel nozzle.

In another embodiment of the combustion system, the fuel supply system comprises a main fuel manifold coupled to the first fuel nozzle and the second fuel nozzle, and wherein each of the first fuel nozzle and the second fuel nozzle define a proportion of the overall supply of fuel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 is another flowchart outlining additional exemplary steps of the method of attenuating combustion dynamics generally provided in FIG. 4.

Figure 1:
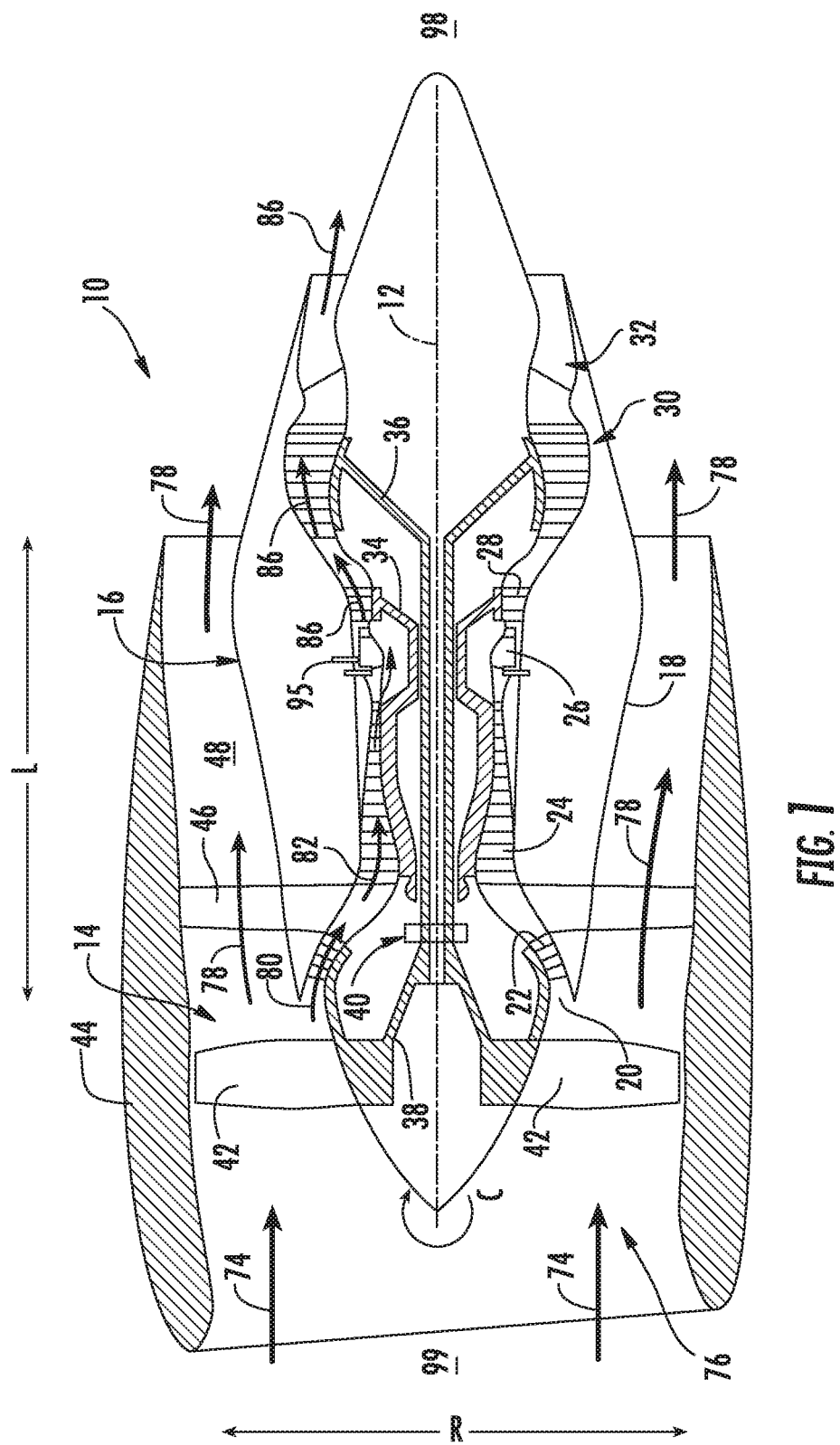
FIG. 1 is a schematic cross sectional view of an exemplary gas turbine engine incorporating an exemplary embodiment of a combustion system according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

References to rotational speed of a shaft, rotor, blades, etc. includes mechanical speed and corrected speed, such as based on one or more of an inlet temperature, ambient temperature, or a proximate temperature of a fluid (e.g., air) within a gas path, unless otherwise specified.

Methods and structures for attenuating combustion dynamics are generally provided that may attenuate combustion dynamics, mitigate emissions, improve lean blowout margin, and attenuate circumferential temperature variations (e.g., hot spots). The methods include varying the flow rate of a first supply of fuel through a first fuel nozzle relative to a second supply of fuel through a second fuel nozzle to change the local stoichiometry and flame structure of the alternating arrangement of the first and second fuel nozzles. The alternating circumferential arrangement of the first fuel nozzle and the second fuel nozzle, such as to define an alternating arrangement of richer burning and leaner burning fuel nozzles, provides circumferential temperature non-uniformity while maintaining overall fuel-air ratio at the combustion chamber exit. As such, the non-uniform flame structure from the alternating circumferential arrangement of the first and second fuel nozzles suppresses combustion dynamics at part-power operating conditions of the gas turbine engine. Furthermore, temperature non-uniformities are then suppressed as the combustion gases flow downstream, such as through a dilution zone of the combustion chamber, thereby mitigating temperature non-uniformity at a turbine section, and associated adverse effects.

The alternating circumferential arrangement of richer burning and leaner burning fuel nozzles moves the fuel-air ratio of each fuel nozzle away from a critical stoichiometry with peak fuel nozzle swirler or mixer combustion dynamics. Furthermore, the alternating arrangement of richer burning and leaner burning fuel nozzles reduces $NO_x$ emissions by moving each fuel nozzle away from the stoichiometry producing maximum oxides of nitrogen. Still further, the aforementioned arrangement may further improve lean blow-out margin, thereby improving combustion stability and engine operability. Furthermore, the alternating arrangement of richer burning and leaner burning fuel nozzles maintains a desired overall fuel-air ratio of the combustion process while mitigating combustion dynamics.

Referring now to the drawings, FIG. 1 is a schematic partially cross-sectioned side view of an exemplary high bypass turbofan engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has an axial or longitudinal centerline axis 12 that extends there through for reference purposes. The engine 10 defines a longitudinal direction L and an upstream end 99 and a downstream end 98 along the longitudinal direction L. The upstream end 99 generally corresponds to an end of the engine 10 along the longitudinal direction L from which air enters the engine 10 and the downstream end 98 generally corresponds to an end at which air exits the engine 10, generally opposite of the upstream end 99 along the longitudinal direction L. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion system 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure compressor and turbine rotatable with an intermediate pressure shaft altogether defining a three-spool gas turbine engine.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
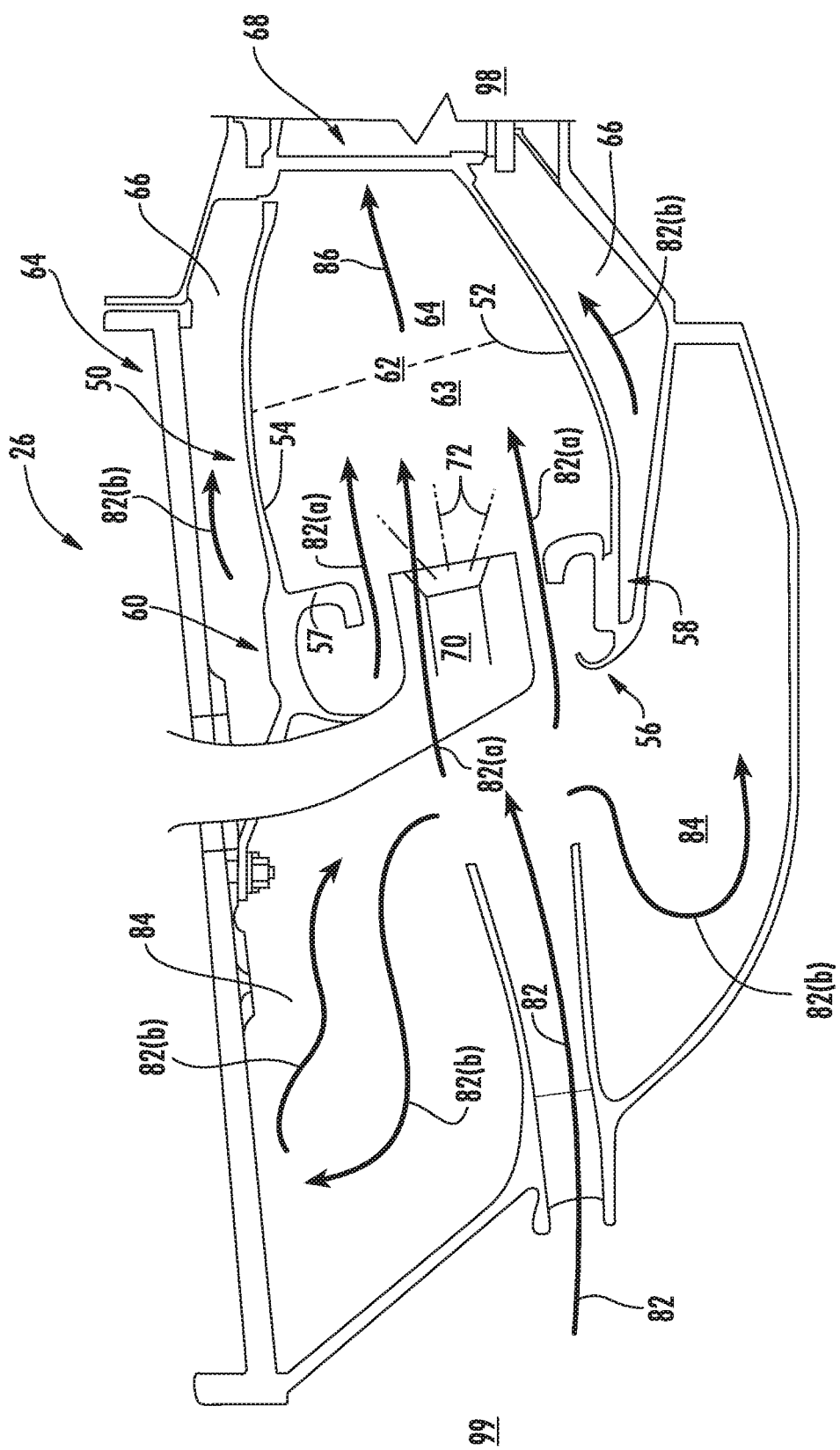
FIG. 2 is an axial cross sectional view of an exemplary embodiment of a combustion system of the exemplary engine shown in FIG. 1.

FIG. 2 is a cross sectional side view of an exemplary combustion system 26 of the core engine 16 as shown in FIG. 1. As shown in FIG. 2, the combustion system 26 may generally include an annular type combustor 50 having an annular inner liner 52, an annular outer liner 54 and a bulkhead 56 that extends radially between upstream ends 58, 60 of the inner liner 52 and the outer liner 54 respectively. In other embodiments of the combustion system 26, the combustion assembly 50 may be a can-annular type. The combustor 50 further includes a dome assembly 57 extended radially between the inner liner 52 and the outer liner 54 downstream of the bulkhead 56. As shown in FIG. 2, the inner liner 52 is radially spaced from the outer liner 54 with respect to engine longitudinal centerline 12 (FIG. 1) and defines a generally annular combustion chamber 62 therebetween. In particular embodiments, the inner liner 52, the outer liner 54, and/or the dome assembly 57 may be at least partially or entirely formed from metal alloys or ceramic matrix composite (CMC) materials.

As shown in FIG. 2, the inner liner 52 and the outer liner 54 may be encased within an outer casing 65. An outer flow passage 66 of a diffuser cavity or pressure plenum 84 may be defined around the inner liner 52 and/or the outer liner 54. The inner liner 52 and the outer liner 54 may extend from the bulkhead 56 towards a turbine nozzle or inlet 68 to the HP turbine 28 (FIG. 1), thus at least partially defining a hot gas path between the combustor assembly 50 and the HP turbine 28. A fuel nozzle assembly 70 may extend at least partially through the bulkhead 56 and dome assembly 57 to provide a fuel-air mixture 72 to the combustion chamber 62. In various embodiments, the bulkhead 56 includes a fuel-air mixing structure attached thereto (e.g., a swirler or mixer assembly).

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion system 26. As shown in FIG. 2, the now compressed air as indicated schematically by arrows 82 flows into a diffuser cavity or pressure plenum 84 of the combustion system 26. The pressure plenum 84 generally surrounds the inner liner 52 and the outer liner 54, and generally upstream of the combustion chamber 62.

The compressed air 82 pressurizes the pressure plenum 84. A first portion of the of the compressed air 82, as indicated schematically by arrows 82(a) flows from the pressure plenum 84 into the combustion chamber 62 through the fuel nozzle 70 (e.g., across a vane structure 46 shown in FIG. 1 configured to promote fuel-air mixing) where it is mixed with the fuel 72 and burned, thus generating combustion gases, as indicated schematically by arrows 86, within the combustor 50. Typically, the LP and HP compressors 22, 24 provide more compressed air to the pressure plenum 84 than is needed for combustion. Therefore, a second portion of the compressed air 82 as indicated schematically by arrows 82(b) may be used for various purposes other than combustion. For example, as shown in FIG. 2, compressed air 82(b) may be routed into the outer flow passage 66 to provide cooling to the inner and outer liners 52, 54.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 3:
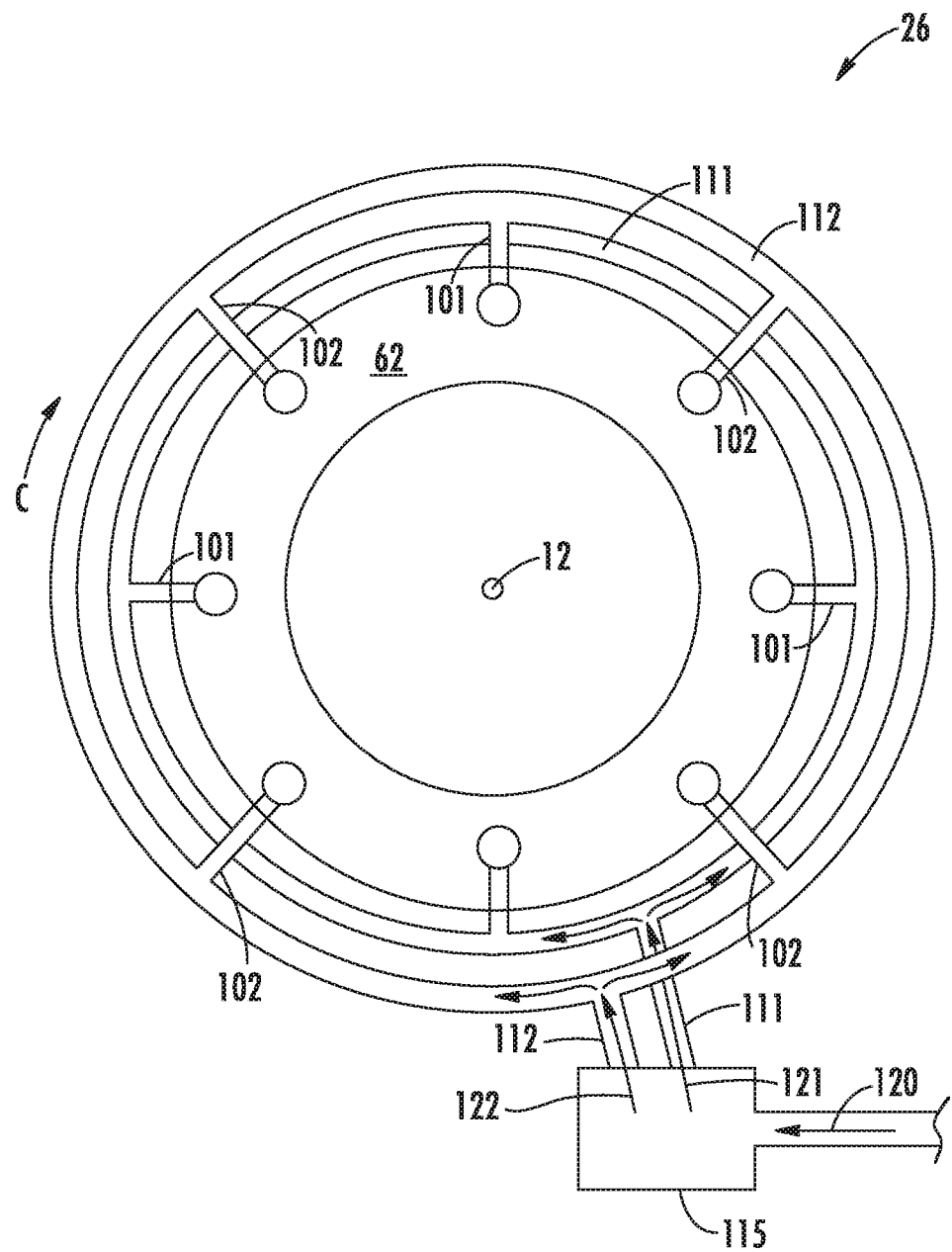
FIG. 3 is a circumferential flowpath view of an exemplary embodiment of the exemplary combustion system generally provided in FIG. 2.

Referring now to the circumferential flowpath view generally provided in FIG. 3, the combustion system 26 further defines the fuel nozzle assembly 70 as including a first fuel nozzle 101 and a second fuel nozzle 102 in alternating circumferential arrangement (i.e., alternating along circumferential direction C around the longitudinal centerline axis 12). The first fuel nozzle 101 and the second fuel nozzle 102 are each coupled to a fuel supply system 115 providing a first supply of fuel 121 to the first fuel nozzle 101 and a second supply of fuel 122 to the second fuel nozzle 102.

The overall supply of fuel 120, and the first supply of fuel 121 and second supply of fuel 122 therefrom, may be split based on a volumetric flow rate or a mass flow rate. Still further, determining a fuel split of the first supply of fuel 121 and second supply of fuel In the embodiment generally provided in FIG. 3, the fuel supply system 115 receives an overall supply of fuel 120 and then splits or divides the overall supply of fuel 120 into the first supply of fuel 121 and the second supply of fuel 122. The first supply of fuel 121 and the second supply of fuel 122 together account for the overall supply of fuel 120 delivered to the combustion chamber 62 for combustion purposes. For example, a desired overall fuel-air ratio at the combustion chamber 62 is based on the overall supply of fuel 120, of which the sum of the first supply of fuel 121 and the second supply of fuel 122 together at least approximately equal the overall supply of fuel 120).

Referring still to FIG. 3, the fuel supply system 115 may include a first fuel manifold 111 coupled to each of the first fuel nozzles 101, and further providing the first supply of fuel 121 to each first fuel nozzle 101. The fuel supply system 115 may further include a second fuel manifold 112 coupled to each of the second fuel nozzles 102, and further providing the second supply of fuel 122 to each second fuel nozzle 102.

In other embodiments, the overall supply of fuel 120 is provided from the fuel supply system 115 to the fuel nozzle assembly 70 including each of the first fuel nozzle 101 and the second fuel nozzle 102. Each first fuel nozzle 101 and second fuel nozzle 102 includes a valve or metering orifice that then limits the portion of the overall supply of fuel 120 that egresses the plurality of fuel nozzles 70 and mixes with air 82(a) and releases into the combustion chamber 62 as the fuel-air mixture 72.

In various embodiments, the fuel supply system 120, including valves, metering orifices, flow restrictors, or other flow or pressure alternating devices, provides at least 50% of the overall supply of fuel 120 as the first supply of fuel 121 egressing the first fuel nozzle 101 and mixing with the air 82(a) as a first fuel-air mixture at the combustion chamber 62. The remainder (i.e., the difference between the overall supply of fuel 120 and the first supply of fuel 121) flows through the each of the second fuel nozzles 102 as the second supply of fuel 122, thereby producing a second fuel-air mixture at the combustion chamber 62 different from the first fuel-air mixture.

In still various embodiments, the first fuel nozzle 101 may define a richer burning fuel nozzle and the second fuel nozzle 102 may define a leaner burning fuel nozzle. In various embodiments, each of the first fuel nozzle 101 and the second fuel nozzle 102 define a rich burning fuel nozzle, in which the first fuel nozzle 101 is richer burning than the leaner burning second fuel nozzle 102. For example, each first fuel nozzle 101 may define a local fuel-air equivalence ratio as providing more fuel in the first fuel-air mixture than is required for complete combustion. As another example, each first fuel nozzle 101 may define a local fuel-air equivalence ratio greater than that of the second fuel nozzle 102, in which each of the first fuel nozzle 101 and the second fuel nozzle 102 define an equivalence ratio greater than 1.0.

At part-power conditions, such as from ignition or light-off to below maximum power (e.g., low power, medium power, or sub-idle, idle, cruise, approach, climb conditions, etc.), the fuel supply system 115 provides at least 50% of the overall supply of fuel 120 to the first fuel nozzles 101. For example, at ignition or low power conditions, approximately 51% to 99% of the overall supply of fuel 120 may egress through the first fuel nozzles 101 as the first fuel-air mixture and the remaining 49% to 1% may egress through the second fuel nozzle 102 as the second fuel-air mixture. In various embodiments, the fuel split may define 85/15 to the first fuel nozzle 101 versus the second fuel nozzle 102; or 75/25 to the first fuel nozzle 101 versus the second fuel nozzle 102; or 60/40, or 55/45, or 51/49, etc. The alternating circumferential arrangement of the first fuel nozzle 101 and the second fuel nozzle 102 defining such fuel splits provides circumferential temperature non-uniformity in the combustion chamber 62 while maintaining an overall desired fuel-air ratio. The alternating circumferential arrangement providing temperature non-uniformity alters the local stoichiometry and flame structure at the first fuel nozzle 101 versus the second fuel nozzle 102 which thereby suppresses combustion dynamics at part-power operating conditions of the gas turbine engine. Additionally, the alternating arrangement of first and second fuel nozzles 101, 102 de-couples heat release from combustion pressure fluctuations, thereby mitigating formation or propagation of combustion dynamics within the combustion chamber 62.

Referring to FIG. 2, the combustion chamber 62 may define a primary combustion zone 63 adjacent to an exit of the plurality of fuel nozzles 70 at which the fuel-air mixture 72 is initially ignited and burned. The primary combustion zone 63 may generally define a region within the combustion chamber 62 at which maximum temperatures of the combustion gases 86 are produced and a dilution zone 64. In various embodiments, the primary combustion zone 63 may further include a secondary combustion zone, in which an upstream end of the primary combustion zone 63 provides an initial temperature rise that facilitates further combustion at the downstream secondary combustion zone.

Referring to FIGS. 2-3, within the primary combustion zone 63, the alternating circumferential arrangement of the first fuel nozzle 101 and the second fuel nozzle 102 may produce circumferential variations in temperature. However, the circumferential variations in temperature are at least partially mitigated by the combination of the plurality of fuel nozzles 70 defining a richer burning fuel nozzle and a leaner burning fuel nozzle. Still further, as the combustion gases 86 flow downstream from the primary combustion zone 63 to the dilution zone 64, circumferential variations in temperature are further attenuated, such as to mitigate or eliminate adverse effects to durability of the turbine section 31. As such, the combination of the decreased initial gradient of the combination of richer burning and leaner burning fuel nozzles (e.g., the first fuel nozzle 101 and the second fuel nozzle 102) further facilitates reduction or elimination of adverse magnitudes of circumferential temperature variations at the turbine section 31.

At maximum power or full load conditions, the fuel supply system 115 provides an approximately 50/50 or approximately equal quantity or portion of the overall supply of fuel 120 to each of the first fuel nozzles 101 and second fuel nozzles 102. As such, at maximum power operating conditions, the fuel supply system 115 mitigates formation of circumferentially non-uniform temperature profiles (e.g., hot spots) along through the combustion chamber 62 that may adversely affect durability of the turbine section 31.

Figure 4:
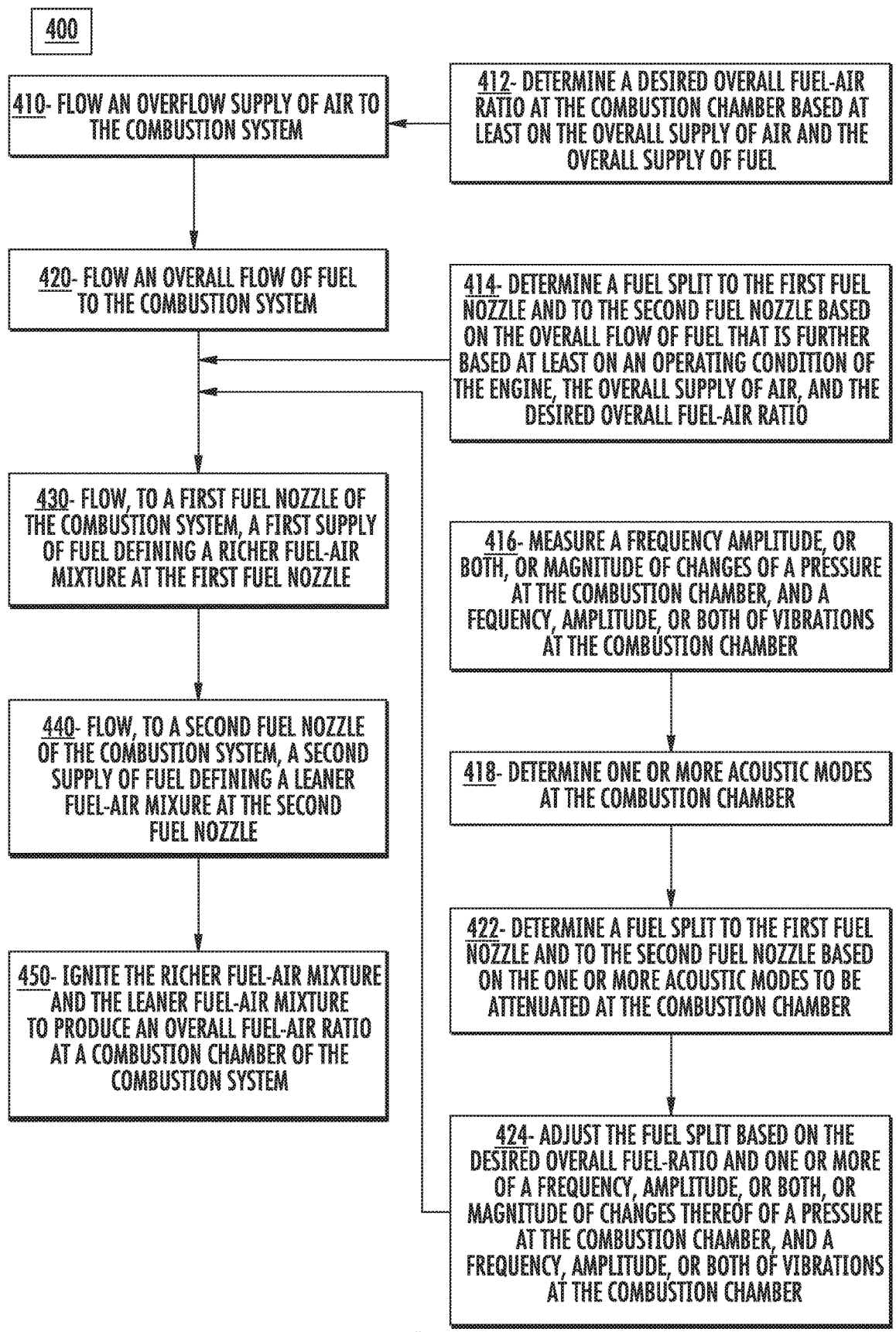
FIG. 4 is a flowchart outlining exemplary steps of a method of attenuating combustion dynamics in a combustion system of a gas turbine engine.

Referring now to FIGS. 4-5, an exemplary flowchart outlining steps of a method of attenuating combustion dynamics is generally provided (hereinafter, "method 400"). The method 400 may be implemented on a combustion system, such as the combustion system 26 generally provided and described in regard to FIGS. 1-3. It should be appreciated that steps of the method 400 may be re-arranged, omitted, or altered within the scope of the present disclosure.

The method 400 includes at 410 flowing, via a compressor section, an overall supply of air (e.g., 82) to the combustion system; at 420 flowing, via a fuel supply system (e.g., 115), an overall flow of fuel (e.g., 120) to the combustion system (e.g., 26); at 430 flowing, to a first fuel nozzle (e.g., 101) of the combustion system, a first supply of fuel (e.g., 121) defining a richer fuel-air mixture at the first fuel nozzle; at 440 flowing, to a second fuel nozzle (e.g., 102) of the combustion system, a second supply of fuel (e.g., 122) defining a leaner fuel-air mixture at the second fuel nozzle; and at 450 igniting the richer fuel-air mixture and the leaner fuel-air mixture to produce an overall fuel-air ratio at a combustion chamber of the combustion system.

In various embodiments, the method 400 further includes at 412 determining a desired overall fuel-air ratio at the combustion chamber based at least on the overall supply of air and the overall supply of fuel. For example, as described in regard to FIGS. 1-3, a desired overall fuel-air ratio at the combustion chamber 62 is defined based on an operating condition of the engine 10. The operating condition is a function of one or more of a low rotor speed (e.g., $N_1$ or $N_L$, or the rotational speed of the LP rotor 36), a high rotor speed (e.g., $N_2$ or $N_H$, or the rotational speed of the HP rotor 34), an overall supply of fuel (e.g., $W_{ftotal}$), an overall supply of air (e.g., $W_a$, or $W_{a3}$ or air flow rate at the combustion system 26), pressure at the combustion system 26 (e.g., $P_3$), temperature at the combustion system 26 (e.g., $T_3$), or engine pressure ratio (EPR), or combinations thereof.

The method 400 may further include at 414 determining a fuel split to the first fuel nozzle and to the second fuel nozzle based on the overall flow of fuel that is further based at least on an operating condition of the engine, the overall supply of air, and the desired overall fuel-air ratio. For example, as described in regard to FIGS. 1-3, the fuel split may be provided at the fuel supply system 115 to define the first supply of fuel 121 and the second supply of fuel 122 from the overall supply of fuel 120. The fuel split defines the first supply of fuel 121 at the first fuel nozzles 101 as at least 50% of the overall supply of fuel 120. The remainder is provided to the second fuel nozzles 102 as the second supply of fuel 122.

As a result of the fuel split, as well as the approximately equal flows of air (e.g., air 82(a)) through and across the plurality of fuel nozzles 70, including the first fuel nozzle 101 and the second fuel nozzle 102, the fuel split defines a first equivalence ratio of a first fuel-air mixture from the first fuel nozzle 101 different from a second equivalence ratio of a second fuel-air mixture from the second fuel nozzle 102 when the operating condition of the engine is less than the maximum power operating condition. For example, the first fuel nozzle 101 may define the first equivalence ratio corresponding to a richer burning while the second fuel nozzle 102 may define the second equivalence ratio corresponding to a leaner burning at the combustion chamber 62. As previously described in regard to FIGS. 1-3, the alternating circumferential arrangement of the first fuel nozzle 101 and the second fuel nozzle 102, such as defining an alternating circumferential arrangement of a richer burning fuel nozzle and a leaner burning fuel nozzle, produces dissimilar flame structures and local stoichiometries at each fuel nozzle 101, 102 that mitigate combustion dynamics while also mitigating production of emissions.

As described in regard to FIGS. 1-3, the fuel split defines a quantity of the first supply of fuel 121 to the first fuel nozzle 101 as between approximately 50% and 99% of the overall supply of fuel 120. The fuel split further defines a quantity of the second supply of fuel 122 to the second fuel nozzle 102 as a difference of the overall supply of fuel 120 from the first supply of fuel 121 to the first fuel nozzle 101. At maximum or high power operating conditions (e.g., full load, or takeoff condition, etc.), the fuel split defines an approximately 50/50 split of the first supply of fuel 121 to the first fuel nozzle 101 and the second supply of fuel 122 to the second fuel nozzle 102. Furthermore, at maximum or high power, the fuel split defines an approximately equal equivalence ratio at the first fuel nozzle 101 and the second fuel nozzle 102 when the operating condition of the engine.

At ignition/re-light, low power, or medium power conditions, or more generally, conditions below maximum or high power, the fuel split may define ratios between the first supply of fuel 121 to the first fuel nozzle 101 and the second supply of fuel 122 to the second fuel nozzle 102 as previously mentioned (e.g., 95/5, 85/15, 75, 25, 65/35, 55/45, etc.). In various embodiments, the fuel split generally approaches approximately 50/50 as the operating condition of the engine 10 increases toward maximum or high power.

In one embodiment at 414, determining the fuel split is based on one or more of a lookup table, a function, or a curve. For example, the function, such as a transfer function, or one or more tables, functions, curves, or references stored at a computer-device including memory and a processor (e.g., a full authority digital engine controller or FADEC), may utilize one or more of a low rotor speed (e.g., $N_1$ or $N_L$, or the rotational speed of the LP rotor 36), a high rotor speed (e.g., $N_2$ or $N_H$, or the rotational speed of the HP rotor 34), an overall supply of fuel (e.g., $W_{ftotal}$), an overall supply of air (e.g., $W_a$, or $W_{a3}$ or air flow rate at the combustion system 26), pressure at the combustion system 26 (e.g., $P_3$), temperature at the combustion system 26 (e.g., $T_3$), or engine pressure ratio (EPR), or combinations thereof to determine the fuel split.

In other embodiments, the method 400 may further include at 416 measuring, via one or more sensors, a frequency, amplitude, or both, or magnitude of changes of a pressure at the combustion chamber, and a frequency, amplitude, or both of vibrations at the combustion chamber. For example, the engine 10 may further include one or more sensors 95 (shown in FIG. 1) measuring, monitoring, or calculating a pressure at the combustion chamber 62. For example, the sensor 95 may sense a dynamic pressure resulting from the heat release produced by ignition of the fuel-air mixture 72 resulting in the combustion gases 86 in the combustion chamber 62. The dynamic pressure may result in frequencies, amplitudes, and changes in magnitudes thereof, that indicates combustion dynamics, or attenuations or excitations thereof resulting in one or more acoustic modes. The sensors 95 may further measure, monitor, or calculate a frequency, amplitude, or both of vibrations at the combustion chamber.

As such, the method 400 may further include at 418 determining one or more acoustic modes at the combustion chamber; at 422 determining a fuel split to the first fuel nozzle and to the second fuel nozzle based on the one or more acoustic modes to be attenuated at the combustion chamber; and at 424 adjusting the fuel split based on the desired overall fuel-air ratio and one or more of a frequency, amplitude, or both, or magnitude of changes thereof of a pressure at the combustion chamber, and a frequency, amplitude, or both of vibrations at the combustion chamber.

In various embodiments at 414, determining the fuel split is further based at least on a desired overall fuel-air ratio at the combustion chamber and the one or more acoustic modes at the combustion chamber to be attenuated.

In still various embodiments, the first fuel nozzle 101 and the second fuel nozzle 102 may be configured to provide different flow rates of air 82(*a*) therethrough for mixing with the first supply of fuel 121 and the second supply of fuel 122, respectively. For example, the first fuel nozzle 101 may define volumes, cross sectional areas, metering orifices, etc. that may restrict or provide a flow of air 82(*a*) through the first fuel nozzle 101 different from the second fuel nozzle 102. In other embodiments, the engine 10 may be configured to provide variable flows to the first fuel nozzle 101 and the second fuel nozzle 102 such as to define the first equivalence ratio and the second equivalence ratio, respectively, from each fuel nozzle 101, 102.

As such, and referring to FIG. 5 in addition to FIG. 4, the method 400 may further include at 426 flowing, through a first fuel-air mixing flowpath of the first fuel nozzle, a first supply of air from the overall supply of air from the compressor section; at 428 mixing the first supply of air with the first supply of fuel within the first fuel-air mixing flowpath of the first fuel nozzle to produce a richer fuel-air mixture; at 432 flowing, through a second fuel-air mixing flowpath of the second fuel nozzle, a second supply of air from the overall supply of air from the compressor section; and at 434 mixing the second supply of air with the second supply of fuel within the second fuel-air mixing flowpath of the second fuel nozzle to produce a leaner fuel-air mixture. Still further, the method may further include at 436 flowing an approximately equal first supply of fuel and second supply of fuel to produce an approximately equal fuel-air mixture at each of the first fuel nozzle and the second fuel nozzle at a maximum power operating condition.

The methods 400 and structures 26 for attenuating combustion dynamics generally provided herein vary the flow rate of the first supply of fuel 121 through the first fuel nozzle 101 relative to the second supply of fuel 122 through the second fuel nozzle 102 to change the local stoichiometry and flame structure of the alternating arrangement of the first and second fuel nozzles 101, 102. The alternating circumferential arrangement of the first fuel nozzle 101 and the second fuel nozzle 102, such as to define an alternating arrangement of richer burning and leaner burning fuel nozzles, provides circumferential temperature non-uniformity while maintaining overall fuel-air ratio at the combustion chamber 62 exit. For example, the circumferential temperature non-uniformity is maintained within a primary combustion zone 63 of the combustion chamber 62 adjacent to the exit (e.g., downstream end) of the plurality of fuel nozzles 70 including the first and second fuel nozzles 101, 102. As such, the non-uniform flame structure from the alternating circumferential arrangement of the first and second fuel nozzles 101, 102 suppresses combustion dynamics at part-power operating conditions of the gas turbine engine (e.g., from sub-idle to under maximum power). Furthermore, temperature non-uniformities are then suppressed as the combustion gases 86 flow downstream (i.e., toward the downstream end 98), such as through a dilution zone 64 of the combustion chamber 62, thereby mitigating temperature non-uniformity and adverse effects thereof (e.g., circumferential hot spots adversely affecting the turbine section).

The alternating circumferential arrangement of richer burning and leaner burning fuel nozzles moves the fuel-air ratio of each fuel nozzle 70 away from a critical stoichiometry with peak fuel nozzle swirler or mixer combustion dynamics. Furthermore, the alternating arrangement of richer burning and leaner burning fuel nozzles reduces emissions of oxides of nitrogen by moving each fuel nozzle 70 away from the stoichiometry producing maximum oxides of nitrogen. Still further, the aforementioned arrangement may further improve lean blow-out margin, thereby improving combustion stability and engine operability. Furthermore, the alternating arrangement of richer burning and leaner burning fuel nozzles maintains a desired overall fuel-air ratio of the combustion process while mitigating combustion dynamics.

All or part of the combustion system 26 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustion system 26, including. Furthermore, the combustor assembly may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a combustion system of an engine to attenuate combustion dynamics, wherein the combustion system comprises (i) a combustor having an inner liner and an outer liner that define an annular combustion chamber therebetween, and (ii) a plurality of fuel nozzles each extended in an annular arrangement around the annular combustion chamber and at least partially through a bulkhead and dome assembly of the combustor, the method comprising:

flowing, via a compressor section, an overall supply of air to the combustion system, wherein at least a portion of the overall supply of air is provided through the plurality of fuel nozzles;

flowing, via a fuel supply system, an overall flow of fuel to the combustion system;

flowing, to a first set of fuel nozzles of the plurality of fuel nozzles, a first supply of fuel from the overall flow of fuel to the combustion system, the first supply of fuel flowing to the first set of fuel nozzles via a first fuel manifold coupled to the fuel supply system, the first supply of fuel producing a first fuel-air mixture from the first set of fuel nozzles;

flowing, through a first fuel-air mixing flowpath of the first set of fuel nozzles, a first supply of air from the overall supply of air from the compressor section;

mixing the first supply of air with the first supply of fuel within the first fuel-air mixing flowpath of the first set of fuel nozzles to produce the first fuel-air mixture;

flowing, to a second set of fuel nozzles of the plurality of fuel nozzles, a second supply of fuel from the overall flow of fuel to the combustion system, the second supply of fuel flowing to the second set of fuel nozzles via a second fuel manifold coupled to the fuel supply system, the second supply of fuel defining a second fuel-air mixture from the second set of fuel nozzles, wherein the second fuel-air mixture is defined leaner than the first fuel-air mixture, and wherein the first fuel-air mixture defines a rich mixture, wherein the first set of fuel nozzles and the second set of fuel nozzles are in an alternating arrangement along a circumferential direction that extends around a longitudinal centerline of the annular combustion chamber of the combustion system, such that each fuel nozzle of the first set of fuel nozzles is adjacent to and alternates with a fuel nozzle of the second set of fuel nozzles along the circumferential direction;

flowing, through a second fuel-air mixing flowpath of the second set of fuel nozzles, a second supply of air from the overall supply of air from the compressor section; and mixing the second supply of air with the second supply of fuel within the second fuel-air mixing flowpath of the second set of fuel nozzles to produce the second fuel-air mixture leaner than the first fuel-air mixture, wherein the first fuel-air mixture and the second fuel-air mixture each produce an equivalence ratio greater than 1.0;

igniting the first fuel-air mixture and the second fuel-air mixture at a primary combustion zone of the annular combustion chamber adjacent to the plurality of fuel nozzles to produce an overall fuel-air ratio of combustion gases at the annular combustion chamber of the combustion system; and flowing the combustion gases downstream from the primary combustion zone to a dilution zone of the annular combustion chamber.

2. The method of claim 1, further comprising:
determining a desired overall fuel-air ratio at the annular combustion chamber based at least on the overall supply of air and the overall flow of fuel.

3. The method of claim 2, further comprising:
determining a fuel split to the first set of fuel nozzles and to the second set of fuel nozzles based on the overall flow of fuel that is further based at least on an operating condition of the engine, the overall supply of air, and the desired overall fuel-air ratio.

4. The method of claim 3, wherein the fuel split defines the first supply of fuel to the first set of fuel nozzles as at least 50% of the overall flow of fuel.

5. The method of claim 4, wherein the fuel split defines a quantity of the first supply of fuel to the first set of fuel nozzles defining a first equivalence ratio different from a quantity of the second supply of fuel to the second set of fuel nozzles defining a second equivalence ratio when the operating condition of the engine is less than a maximum power operating condition.

6. The method of claim 5, wherein the fuel split defines the quantity of the first supply of fuel to the first set of fuel nozzles as between approximately 50% and 99% of the overall flow of fuel, and wherein the fuel split defines the quantity of the second supply of fuel to the second set of fuel nozzles as a difference of the overall flow of fuel from the first supply of fuel to the first set of fuel nozzles.

7. The method of claim 3, wherein the fuel split defines an approximately 50/50 split of the first supply of fuel to the first set of fuel nozzles and the second supply of fuel to the second set of fuel nozzles when the operating condition of the engine is at a maximum power operating condition.

8. The method of claim 7, wherein the fuel split defines an approximately equal equivalence ratio at the first set of fuel nozzles and the second set of fuel nozzles when the operating condition of the engine is at the maximum power operating condition.

9. The method of claim 3, wherein the fuel split generally approaches approximately 50/50 as the operating condition of the engine increases toward maximum or high power.

10. The method of claim 2, wherein determining the desired overall fuel-air ratio at the annular combustion chamber is a function of one or more of a pressure and a temperature of the overall supply of air at the combustion system.

11. The method of claim 1, further comprising:
determining one or more acoustic modes at the annular combustion chamber; and
determining a fuel split to the first set of fuel nozzles and to the second set of fuel nozzles based on the one or more acoustic modes to be attenuated at the annular combustion chamber.

12. The method of claim 11, wherein determining the fuel split is based at least on a desired overall fuel-air ratio at the annular combustion chamber and the one or more acoustic modes at the annular combustion chamber to be attenuated.

13. The method of claim 12, further comprising:
adjusting the fuel split based on the desired overall fuel-air ratio and one or more of a frequency, an amplitude, or both, or a magnitude of changes thereof of a pressure at the annular combustion chamber, and a frequency, an amplitude, or both of vibrations at the annular combustion chamber.

14. The method of claim 13, further comprising:
measuring, via one or more sensors, the frequency, the amplitude, or both, or the magnitude of changes of the pressure at the annular combustion chamber, and the frequency, the amplitude, or both of vibrations at the annular combustion chamber.

15. The method of claim 1, further comprising:
flowing an approximately equal first supply of fuel and second supply of fuel to produce an approximately equal fuel-air mixture at each of the first set of fuel nozzles and the second set of fuel nozzles at a maximum power operating condition.

16. The method of claim 1, wherein igniting the first fuel-air mixture and the second fuel-air mixture produces dissimilar local stoichiometries from the first set of fuel nozzles relative to the second set of fuel nozzles.

\* \* \* \* \*